Patented Sept. 8, 1925.

1,553,294

UNITED STATES PATENT OFFICE.

JOHN C. BAKER, OF NUTLEY, NEW JERSEY, ASSIGNOR TO WALLACE & TIERNAN PRODUCTS, INCORPORATED, OF BELLEVILLE, NEW JERSEY, A CORPORATION OF NEW JERSEY.

SHORTENING COMPOUND.

No Drawing.    Application filed September 2, 1921.    Serial No. 498,083.

*To all whom it may concern:*

Be it known that I, JOHN C. BAKER, a citizen of the United States, residing at Nutley, in the county of Essex and State of New Jersey, have invented certain new and useful Improvements in Shortening Compounds; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to a composition of matter which consists, essentially, in the provision of a shortening compound and method of making the same, with a view of providing a shortening for use, more especially, in the making of pie crusts, but which may also be readily used in the making of various pastries, crullers, biscuits, and the like.

The present invention has for its principal object the production of a shortening compound which has many valuable properties, being fluid in form, has an attractive snow-white appearance, does not easily spoil or become rancid after opening, keeping its condition for a long period after being opened, without refrigeration, being readily miscible with water, eggs, or milk, thereby saving much time in cooking, makes a pie-crust dough by adding only flour and salt, and finally makes more tender, flaky, and lighter baked products.

Other objects of the present invention not at this time more particularly enumerated, will be clearly understood from the following detailed description of the same.

With the various objects of the present invention in view, the said invention consists, primarily, in a novel shortening compound of the general character hereinafter more fully set forth, which consists of an edible fat emulsed in water with a suitable added substance or substances, so as to render the same stable or permanent, and of a fluid or semi-fluid nature.

It is well known, that the making of pie-crust has always been considered one of the most difficult and uncertain cooking operations that the housewife has to undertake, the crust being either tough or too short.

By my invention, I have produced a composition of matter and method of making the same, which entirely removes the uncertainty of making a perfect pie-crust or other pastry; and, I have devised a shortening compound of such a nature and of such characteristics, that any person can readily obtain satisfactory pie-crust, and the like. It will be understood, that the making of the pie-crust is merely one of the many uses to which my novel composition of matter may be put, as the same also has great advantage as a shortening agent in the manufacture or baking of cakes, doughnuts, biscuits, pancakes, waffles, and other food in the preparation of which shortening is used.

My novel form of product or composition of matter, for use as a shortening agent or compound consists, essentially, of the following ingredients, preferably in the proportions stated:

| | |
|---|---|
| Edible fat | 50% to 55% |
| Water | 49% to 44% |
| A protective agent, such for example as sodium stearate | 0.5% |
| A stabilizing agent, such for example as stearic acid | 0.5% |

The above-stated composition of matter is emulsed through a suitable orifice at high pressure to about 3000 pounds per square inch.

Many advantages are gained, and some of these are;—

Firstly:—A finer, lighter and more tender baked product with the same or less amount of fat.

Secondly:—A large saving in time and effort in the making of the same.

Thirdly:—Economy in the amount of fat required to produce a given effect, resulting in a delightful food, without making the same excessively rich in fat.

And lastly:—A more digestible food, due to the fine sub-division of the fats and the reduced quantity of fat.

Other advantages are a convenient fluid-form of the compound produced, the same having excellent keeping qualities, without addition of a preservative, the non-soaking of grease in products cooked in deep fat, and many other points of advantage, not here mentioned, which will be noted by the user.

Primarily, the product consists essentially of an edible fat, emulsed in water, and rendered permanent by the addition of a protective agent which alters the surface tension of the aqueous phase.

Further stability or permanency may be gained by the addition of a stabilizing agent which alters the surface-tension of the fat.

For most cooking purposes the compound may contain upwards of 40% fat, either of a fluid or a semi-fluid consistency. However, for making pie-crust, without addition of further water, the compound may contain between 45% and 60% fat, of a fluid nature; but preferably from 50% to 55% fat should be used for the best results, as I have found by practical tests, that mixtures containing 60% fat make too rich a crust, and mixtures containing 45% fat make a tough crust.

The protective agents or materials which may be used, may be skim milk solids, casein dissolved in base, starch, gums, soap, or any of the well-known protective colloids. However, I have found objections to the use of many of the above.

Skim milk or casein compounds give very fine emulsions, which are permanent and of good cooking properties, but they spoil quickly on opening, rendering a sterile preparation necessary. In case milk-solids are used, the mixture or compound is not useable for pie-crusts because of the well-known tendency of milk-sugar to char with heat. Starches and gums are poor in protective qualities, and tend to produce non-fluid preparations. Soaps are very excellent protective agents and can be used for the purposes in hand; however, many soaps add objectionable flavor or odor to the food-product, and if used in large quantity, add sufficient alkali to interfere with the addition of baking powder, and also tend to corrode and render unsightly the tinned container in which the compound is put up for sale. Soap, furthermore, will produce a soapy-tasting preparation, unless used very sparingly.

I have found in practice, that sodium stearate as a protective agent produces excellent results, but that it has all the defects cited in the above in conjunction with soaps, and, also if used in sufficiently small amount to produce fluid-preparations, the same tend to become instable. By the addition, however, of stearic acid used in conjunction with the sodium stearate, a better stabilizing effect is obtained, and the objectional features above mentioned are overcome.

The herein-before mentioned preferred proportions of the compound, I have found in practice, will give the most excellent results in every way, and a fluid, permanent or stable and very slightly alkaline preparation is the result, which has no alkaline taste and does not corrode the tinned containers.

I am also aware, that the proportions of the sodium stearate and of the stearic acid, when such agents are used, may be varied up to a maximum of 1½% of sodium stearate, and 5% of stearic acid; however, the sodium stearate cannot be used alone in as large an amount as 1½% without producing an alkaline flavored and non-fluid preparation.

Of course, it will be understood that other fatty acids or basic fatty acid compounds, other than sodium stearate and stearic acid may be used, such as oleic acid, and sodium or potassium oleate, or palmitic acid and sodium palmitate, or any given acid and compound can be respectively used, different from the above-stated combinations, such as stearic acid and sodium oleate; or the mixture can be ordinary soap to which has been added some acid in sufficient quantity to release some of the fatty acid of the soap, or the fatty acid may originate in the fat itself.

The essential condition required is the presence of a soluble basic compound of a high fatty acid and a higher fatty acid which is compatible, and in all cases the materials used should be edible.

It will be understood, also, that there are other substances, other than fatty acids which, when dissolved in fat, will alter its surface-tension sufficiently to render it stable in emulsion, such materials being cholesterin, naphtenic sulphates, and fatty acid sulphonates. I am also aware, that lecithin, as found in egg-yolk or milk, may be used to stabilize a fatty emulsion but such use in the combination of materials renders the same commercially prohibitive and therefore not feasible. Another combination of protective agent and substance to modify the surface-tension of the fat may be attained by the use with the same of sodium caseinate or starchy substance and a fatty acid.

The fats used in the preparations of these emulsions are to be of an edible nature, and preferably, though not necessarily so, of a semi-solid consistency at ordinary temperatures.

Satisfactory preparations for the desired purpose have been made by myself from the following fats or mixture of fats, namely:— lard, tallow, cocoanut oil, palm nut oil, corn oil, cotton seed oil, hydrogenated cotton seed oil and butter oil, and also with mixtures of tallow and cotton seed oil or corn oil, so that the mixture is semi-solid, and also with oleo oil expressed from tallow, and in fact any edible oil or fat can be used.

Of course, is will be evident, that the conditions for making permanent or stable emulsions from these fats and oils must necessarily vary with each oil used, different amounts of the protective agents and the stabilizing agents being required as a minimum for each.

Briefly stated the shortening compound consists of either:—

Edible fat. {Lard, Tallow, Cotton seed oil, Hydrogenated oil, Other edible oils or fats, or mixtures of the above.} Preferably of a semi-solid consistency and constituting 45% to 60% of the total compound.

A protective agent which alters the surface-tension of the aqueous phase or water. Should be edible, 1/4% to 5% of the total compound. {Starch, Milk solids, not fat, Casein solutions, Gums, Soaps {Sodium, Calcium, Potassium, Ammonium} Caseinate {Sodium, Potassium, Ammonium} {Stearate, Palmitate, Oleate}}

Stabilizing agent which acts by altering the surface-tension of the fats. 1/4% to 5% of the total compound. {Stearic acid, Palmitic acid, Oleic acid, Other higher fatty acid or oil-soluble, edible material which reduces surface-tension of the fat.}

Water—Sufficient to balance the compound to 100%.

The stabilizing agent may or may not be required to make the preparation stable. In case the fat is finely enough sub-divided, or the protective agent is sufficiently strong, it can be omitted. However, in general, its use makes a better preparation.

While the finished product is desired to be fluid, for some uses a semi-solid preparation is satisfactory. The thickness of the shortening is increased by using solid fats, by using larger amounts of fat, by subdividing the fat finer, or by selecting protective agent which has thickening characteristics as will be clearly evident.

What I claim is:—

1. A fluid shortening compound consisting of an edible fat in proportion exceeding 40 per cent emulsed in water, combined with a protective agent dissolved in water to render the same permanent, and a stabilizing agent dissolved in the fat.

2. A fluid shortening compound consisting of not less than 45% or more than 60% of an edible fat emulsed in water, combined with agents to render the emulsion permanent in proportion not exceeding 3%.

3. A fluid shortening compound consisting of not less than 45% or more than 60% of an edible fat emulsed in water, combined with a protective agent adapted to alter the surface tension of the aqueous phase, in proportion of not more than 5%, and a stabilizing agent adapted to alter the surface tension of the fat in proportion not exceeding 5%.

4. A shortening compound consisting of the following edible fat, 53%, water, 46%, sodium stearate 0.5%, and stearic acid 0.5%.

5. A fluid shortening compound consisting of 45% to 60% of edible fat emulsed in water with sodium stearate and stearic acid sufficient in amount to render the resultant emulsion permanent.

6. A fluid shortening compound consisting of edible fat in proportion exceeding 40% emulsed in water with a water soluble basic higher fatty acid, dissolved in water and a higher fatty acid dissolved in the fat.

7. A fluid shortening compound consisting of 45% to 60% of edible fat emulsed in water combined with agents to render the emulsion permanent.

8. A fluid shortening compound consisting of fat in proportion exceeding 40% emulsed in water combined with an agent or agents in proportion not exceeding 3% to render the same permanent.

In testimony, that I claim the invention set forth above I have hereunto set my hand this 1st day of September, 1921.

JOHN C. BAKER.